May 27, 1924.

G. W. CRANE

DRILL SETTING DEVICE

Filed Sept. 24, 1923

1,495,887

Inventor
G. W. Crane

Witness
H. Woodard

By H. B. Wilson & Co.
Attorneys

Patented May 27, 1924.

1,495,887

UNITED STATES PATENT OFFICE.

GEORGE W. CRANE, OF NEW ORLEANS, LOUISIANA.

DRILL-SETTING DEVICE.

Application filed September 24, 1923. Serial No. 664,538.

*To all whom it may concern:*

Be it known that I, GEORGE W. CRANE, a citizen of the United States, residing at New Orleans, in the parish of Orleans and State of Louisiana, have invented certain new and useful Improvements in Drill-Setting Devices; and I do declare the following to be a full, clear, and exact description of the invention, such as will enable others skilled in the art to which it appertains to make and use the same.

My invention relates to twist drill grinders in which it is necessary to position a drill to be ground, in a predetermined position in the drill holder, in order that the cutting end of such drill may be properly presented to the grinding wheel. In a particular type of grinder, disclosed in my pending U. S. application, Serial No. 659,225, filed August 5, 1923, a guide member clamped on the drill, coacts with another guide associated with the drill holder, to insure proper presentation of the drill point to the grinding wheel, and it is the object of the present invention to provide a novel arrangement and construction of parts for setting the drill and the guide member in proper relation with each other, before application thereof to the drill grinder.

With the foregoing in view, my invention resides in the novel subject matter hereinafter described and claimed, supplemented by the accompanying drawings.

Figure 1 is a front elevation of the drill setting device constructed in accordance with my invention.

Figure 2 is a side elevation.

Figure 3 is a vertical sectional view as indicated by line 3—3 of Fig. 1.

Figure 4 is a horizontal sectional view on line 4—4 of Fig. 1.

Figures 5 and 6 are horizontal sections on lines 5—5 and 6—6 of Fig. 2.

Figure 7 is a horizontal sectional view through the guide member which is clamped on the drill.

In the drawings above briefly described, the numeral 1 designates a base block which is preferably provided with an attaching flange 2 through which screws or the like 3 may be passed to secure said block upon a suitable supporting member 4 which may well be a part of the base of a drill grinding machine. The block 1 is provided with a vertical, flat-sided guideway 5, with a vertical bore or opening 6, and with a horizontal bearing 7, said block being split at one side of the guideway 5, as indicated at 8, and being provided with a suitable clamping means 9, whereby it may be contracted about a flat-sided shank 10 which is received in the guideway for vertical adjustment. The upper end of the shank 10 is turned downwardly and provided with a drill centering device 11 which is vertically alined with another drill centering device 12 in the nature of a plunger, the lower portion of this plunger being slidably received in the opening 6 and being provided with a stem 13 and a nut or the like 14 for limiting its upward movement, under the influence of a coil spring 15 which is housed in the opening 6 between the plunger and the bottom of said opening. The upper end of the plunger 12 is provided with a tapered socket 16 to receive and center the butt end of a twist drill D.

In the preferred form of construction, the centering device 11 includes a shell 17 which retains a pair of metal blocks 18, said blocks being jointly recessed at 19, to provide a socket to receive and center the cutting end of the drill D, said socket being of tapered form. The two recesses 19 are offset slightly from each other to provide a pair of stop shoulders 20 with which the cutting edges of the drill D come in contact when said drill is turned to the proper extent, and when said cutting edges are in engagement with said stops, a suitable guide member 21 is clamped on the drill for coaction with a guide of the grinding machine in which the drill is to be sharpened. In order that this guide member may be clamped upon the drill in a predetermined fixed relation with the cutting edges, insuring that these edges may be properly presented to the grinding wheel of the machine, I provide positioning means with which said guide member is engaged, before it is tightened upon the drill. In the present showing, a shaft 22 is rotatable in the bearing 7 and carries a pair of posts or arms 23 on its ends, said shaft and the parts 23, being movable as a single unit, so that the arms may be swung downwardly out of the way as indicated in dotted lines in Fig. 2, when desired. I provide a suitable stop 24, however, to be struck by one of the posts 23 to limit movement in the other direction, to an operative position, as disclosed in full lines in the several views.

In operating the device, the clamp 9 is released to permit vertical sliding of the shank 10, thus permitting the drill D to be held and centered between the devices 11 and 12. The drill may then be turned until its cutting edges snap past the shoulders 20, or come up against said shoulders if the drill is turned in the other direction, and the spring 15 which has been placed on compression by depressing the shank 10 and tightening the clamp 9, now frictionally holds the drill against rotation. With the posts 23 now swung upwardly to operative position, the guide member 21 is positioned against the front edges of these posts and is clamped upon the drill. Thus, the guide member 21 is secured upon the drill in a predetermined fixed relation with the cutting edges of the latter and when said guide member and drill are bodily transferred to the drill grinding machine, and the guide member is engaged with a guide of such machine, it is insured that the cutting edges of the drill shall be properly presented to the grinding wheel.

The invention is simple and inexpensive, yet is highly efficient and desirable, and as excellent results have been obtained from the details disclosed, they are preferably followed. However, within the scope of the invention as claimed, numerous minor changes may be made.

I claim:—

1. A device of the class described comprising means for holding a twist drill in a fixed position, while a guide member is being applied thereto, and positioning means for the guide member having predetermined relation with said holding means.

2. A device of the class described comprising a support provided with relatively stationary and movable centering devices to engage the ends of a twist drill and hold the same while a guide member is being applied thereto, one of said centering devices having a stop to limit turning of the drill, and a positioning device for the guide member carried by said support and having a predetermined relation with said stop.

3. A device for holding a drill while applying a guide member thereto, comprising a base having a guideway and a socket, the latter being adapted to receive one end of a twist drill, a shank adjustably held in engagement with said guideway and having a socket opening toward the aforesaid socket to receive the other end of the drill, one of said sockets having a stop to hold the drill against turning, and a positioning device carried by said base for positioning the guide member on the drill in a predetermined manner.

4. A structure as specified in claim 2; said positioning device comprising a post pivoted to said support for movement in one direction to an inoperative position when desired, and means for limiting the movement of said post in the other direction to an operative position.

5. A structure as specified in claim 2; the relatively stationary centering device being yieldably mounted.

6. A device for holding a drill while applying a guide member thereto comprising a base having a guideway, an opening parallel to said guideway and a bearing transverse to said opening, a spring-projected plunger in said opening having a socket to receive the butt end of a twist drill, a shank adjustably and non-rotatably held in engagement with said guideway, said shank having a socket facing the aforesaid socket to receive the cutting end of the drill, the socket of said shank having a stop to engage the drill and hold the same in a predetermined position, a post for contact with the guide member to insure proper positioning thereof on the drill, a shaft carrying said post and mounted in the aforesaid bearing of said base, and means for limiting the movement of said post to operative position.

In testimony whereof I have hereunto affixed my signature.

GEORGE W. CRANE.